P. W. BROWNBACK.
Sausage Stuffers.

No. 142,897. Patented September 16, 1873.

Witnesses.
E. H. Bates
Chas. B. Steele

Inventor.
P. W. Brownback,
Chapman Bronson & Co,
attys,

UNITED STATES PATENT OFFICE.

PENROSE W. BROWNBACK, OF LIMERICK STATION, PENNSYLVANIA.

IMPROVEMENT IN SAUSAGE-STUFFERS.

Specification forming part of Letters Patent No. 142,897, dated September 16, 1873; application filed March 29, 1873.

*To all whom it may concern:*

Be it known that I, PENROSE W. BROWNBACK, of Limerick Station, in the county of Montgomery and State of Pennsylvania, have invented a new and valuable Improvement in Sausage-Stuffer; and I do hereby declare that the following is a full, clear, and exact description of the construction and operation of the same, reference being had to the annexed drawings making a part of this specification, and to the letters and figures of reference marked thereon.

Figure 1:
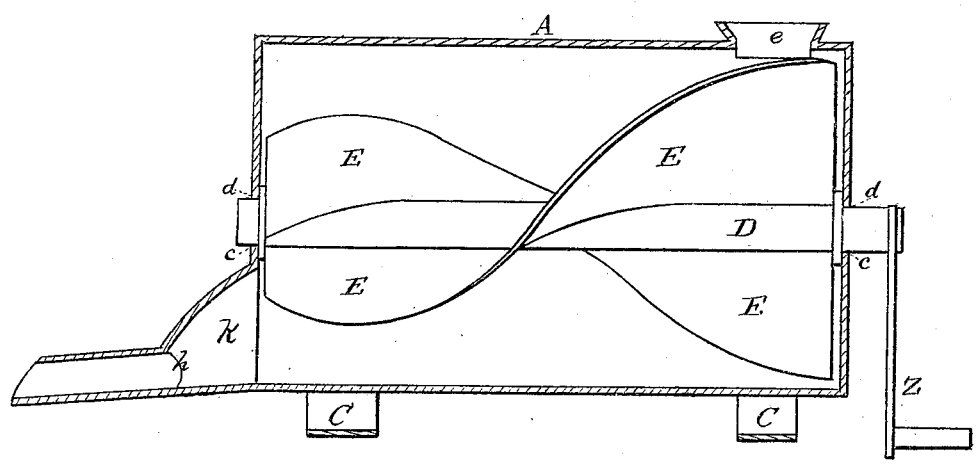
Figure 2:
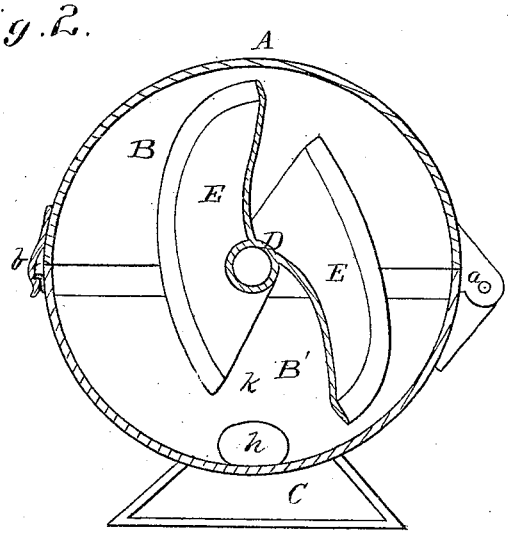

Figure 1 of the drawings is a representation of a longitudinal central vertical section of my sausage-stuffer. Fig. 2 is a transverse vertical section of the same.

This invention has relation to means for filling sausage-skins; and it consists, mainly, in the construction and novel arrangement of the cylindrical or conical casing, having its side wall extended in the lower or body portion, and gradually contracted or brought together to form a large funnel, which terminates horizontally in the discharge-pipe; and, in connection therewith, of the rotating shaft, journaled at each end to the casing, and provided with the broad spiral wings, having a pitch equal to the length of the casing, as hereinafter more fully described.

In the accompanying drawings, the letter A indicates the casing, of cylindrical or conical form, made in two sections, B B', hinged together at $a$, and provided with a hook or hasp, $b$. At the center of each end, the casing is provided with journal-seats $c$ in the wall of the lower section or body, the wall of the upper section forming corresponding journal-caps $d$. The upper section or cover is provided with a feeding-funnel, $e$, at one end. At the other end of the casing the longitudinal or side wall is extended outward, and gradually contracted or brought together in conical form to provide a funnel-shaped recess, $k$, without shoulders at the end of the casing, connecting the same with the discharge-spout $h$. D indicates the shaft, located in the axis of the casing, and journaled at its ends in the seats $c$, above mentioned. Secured to this shaft, on opposite sides thereof, from end to end in spiral or twisted form, are the forcing or conveying wings E E. These wings, besides their spiral twist, are usually designed to be curved transversely, or in the direction of their rotation, for the purpose of scooping the mass of meat forward.

When ready for operation, the sausage-skins are secured to the spout $h$, and, the meat having been introduced into the casing, the upper section is fastened down, and the conveyer, by the crank Z, forcing the meat into the funnel-recess $k$, where it is squeezed and packed together firmly, the air being kept back, and the mass passing in this compact form through the spout $h$ into the skin. As the mass of meat is fed forward by the conveyer, the space behind the wings thereof is kept full by introducing material through the feed-funnel $c$.

I am well aware that it is not new to make a casing for this purpose in sectional form, and that the auger-feed has been employed with a pitch of several times the length of the case. Therefore I do not claim such devices broadly; but

What I claim, and desire to secure by Letters Patent, is—

In a sausage-stuffing machine having a spiral conveyer of long pitch, the casing having the side wall of its lower portion or body gradually contracted without a shoulder, forming the tapering recess $k$, connecting said side wall with the discharge-spout $h$, substantially as specified.

In testimony that I claim the above I have hereunto subscribed my name in the presence of two witnesses.

PENROSE W. BROWNBACK.

Witnesses:
G. E. BROWNBACK,
AMOS E. JONES.